Figure 1:
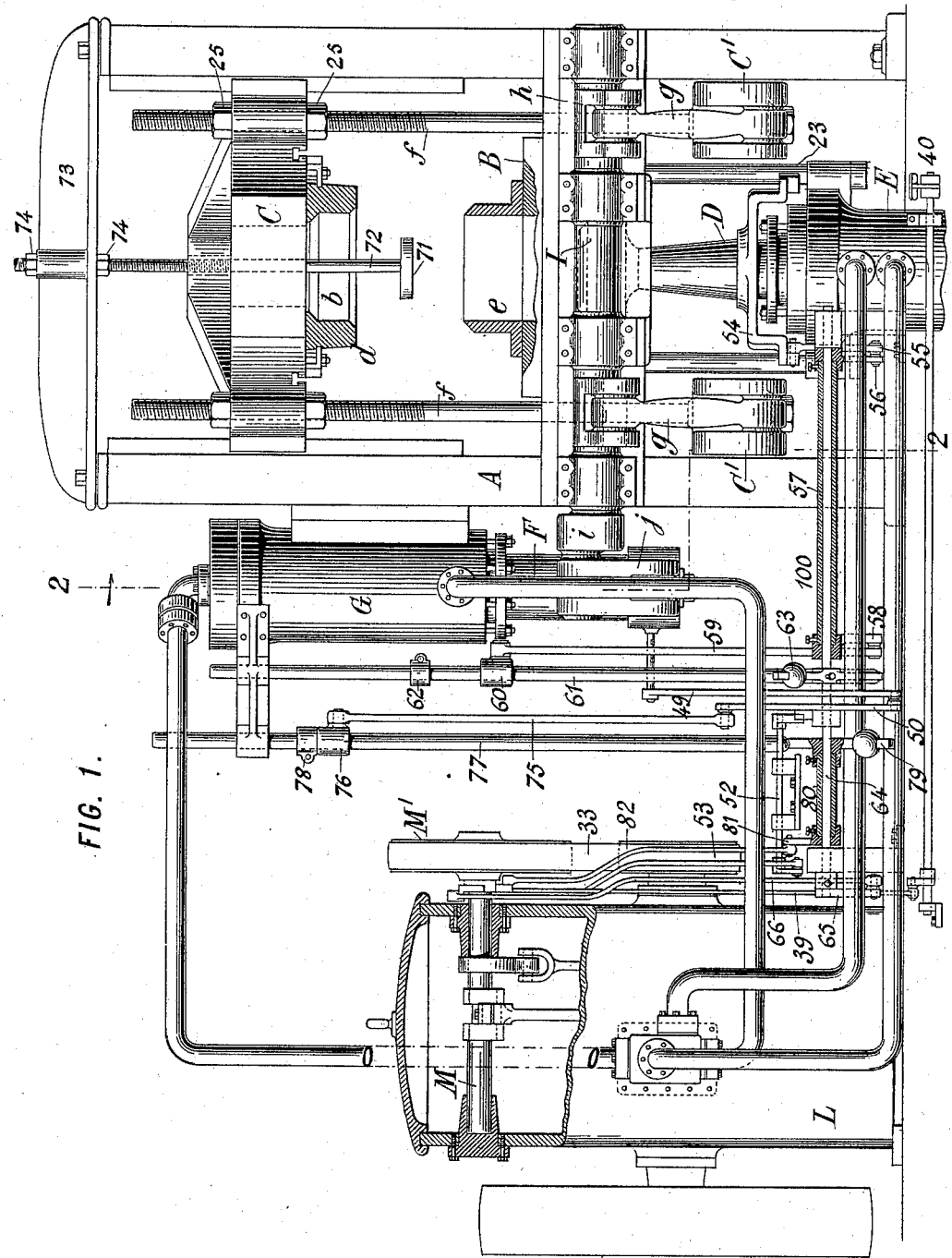

(No Model.) 7 Sheets—Sheet 1.

F. M. LEAVITT.
HYDRAULIC PRESS.

No. 604,056. Patented May 17, 1898.

WITNESSES:
Fred White
Thomas F. Wallace

INVENTOR:
Frank M. Leavitt,
By his Attorneys,
Arthur C. Fraser & Co.

THE NORRIS PETERS CO., PHOTO-LITHO., WASHINGTON, D. C.

(No Model.) 7 Sheets—Sheet 2.

F. M. LEAVITT.
HYDRAULIC PRESS.

No. 604,056. Patented May 17, 1898.

WITNESSES:
Fred White
Thomas F. Wallace

INVENTOR:
Frank M. Leavitt,
By his Attorneys,
Arthur C. Fraser & Co.

(No Model.) 7 Sheets—Sheet 3.
F. M. LEAVITT.
HYDRAULIC PRESS.
No. 604,056. Patented May 17, 1898.
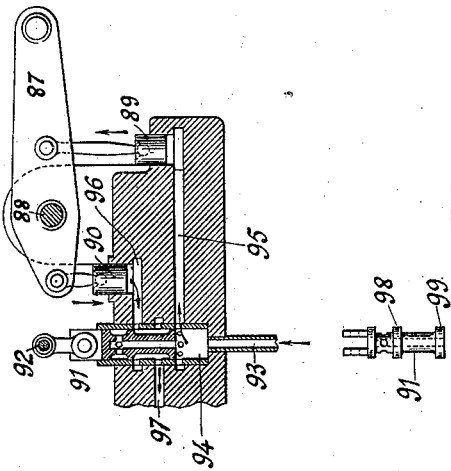
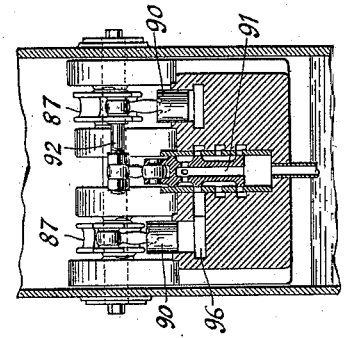
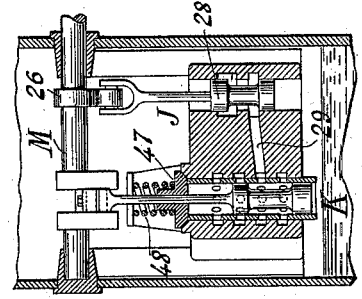
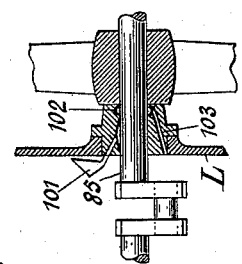
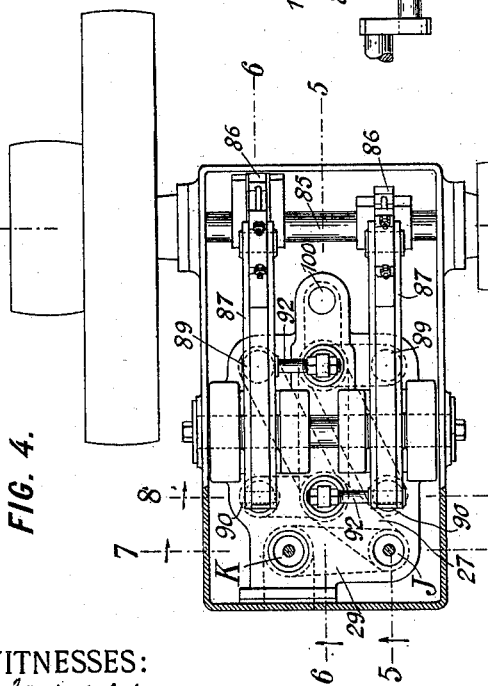
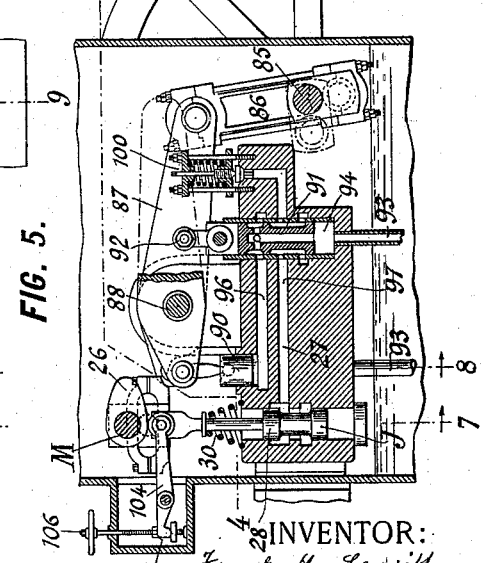
WITNESSES:
Fred White
Thomas F. Wallace
INVENTOR:
Frank M. Leavitt,
By his Attorneys, (No Model.) 7 Sheets—Sheet 4.
F. M. LEAVITT.
HYDRAULIC PRESS.
No. 604,056. Patented May 17, 1898.
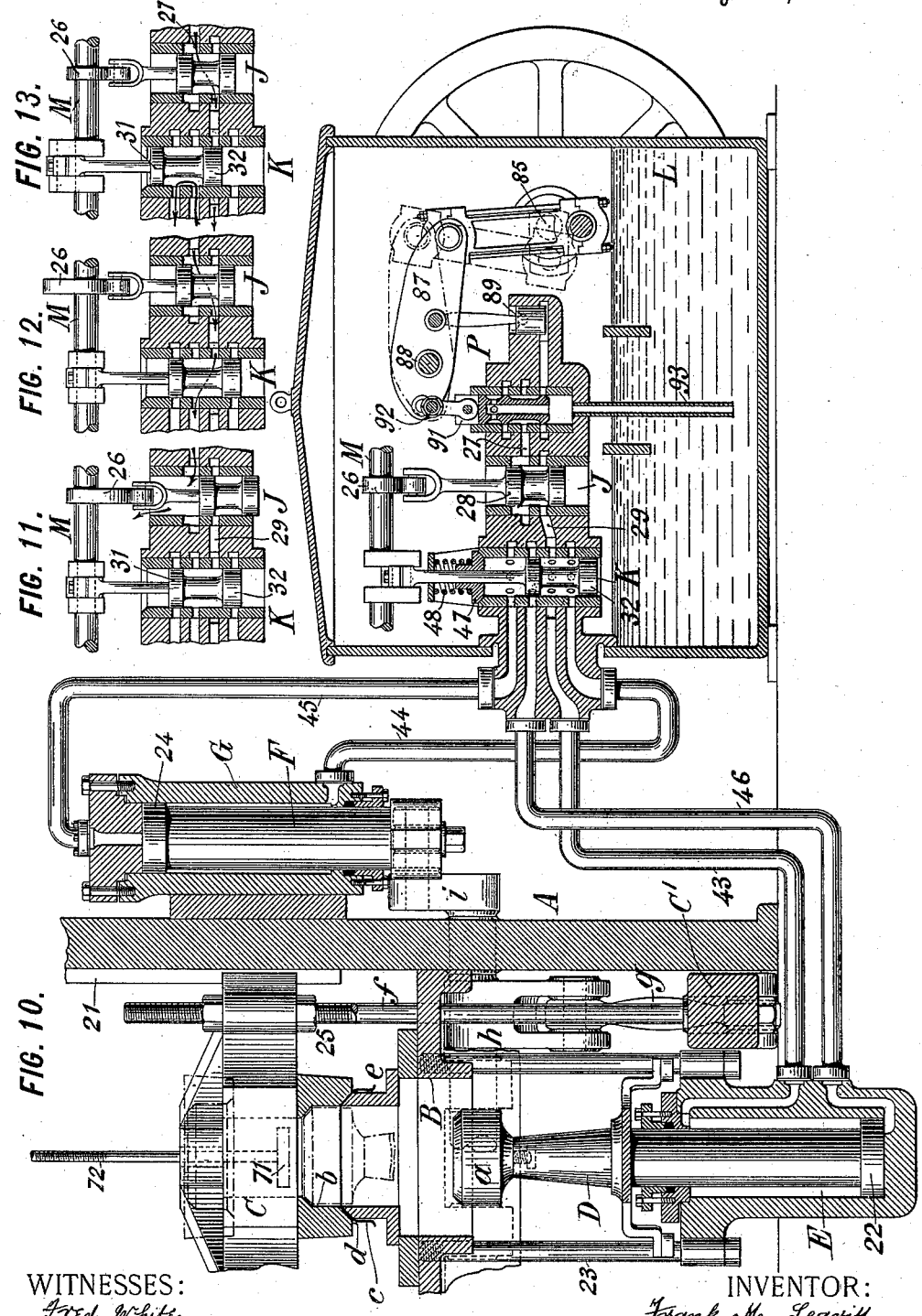
WITNESSES:
Fred White
Thomas F. Wallace
INVENTOR:
Frank M. Leavitt,
By his Attorneys,
Arthur C. Fraser & Co.
THE NORRIS PETERS CO., PHOTO-LITHO., WASHINGTON, D. C.

(No Model.) 7 Sheets—Sheet 5.
F. M. LEAVITT.
HYDRAULIC PRESS.
No. 604,056. Patented May 17, 1898.
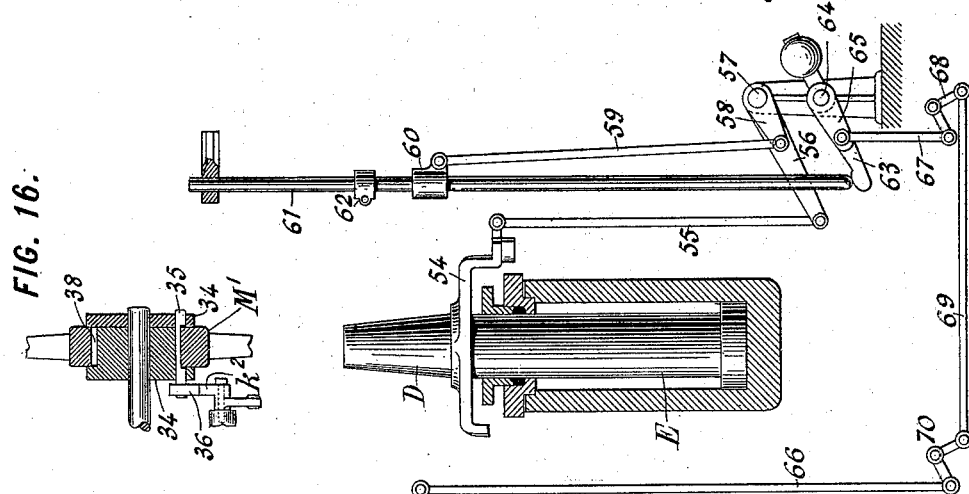
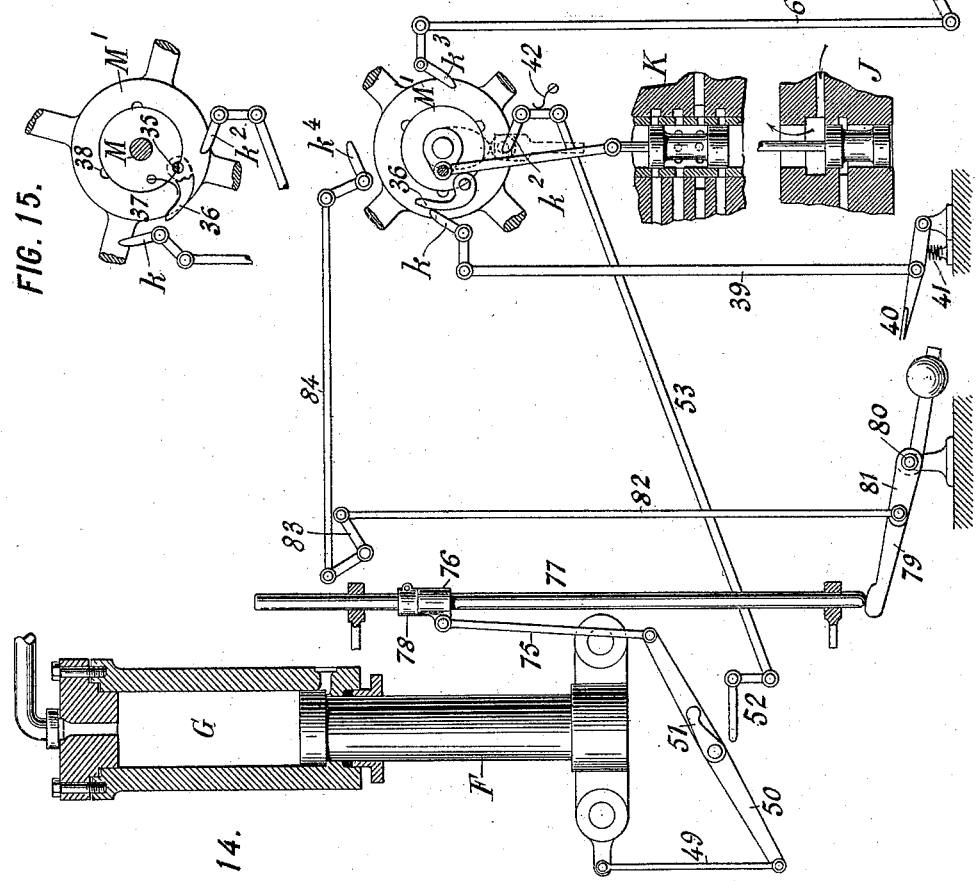
WITNESSES:
Fred White
Thomas F. Wallace
INVENTOR:
Frank M. Leavitt,
By his Attorneys,
Arthur C. Fraser & Co.

(No Model.) 7 Sheets—Sheet 6.
F. M. LEAVITT.
HYDRAULIC PRESS.
No. 604,056. Patented May 17, 1898.
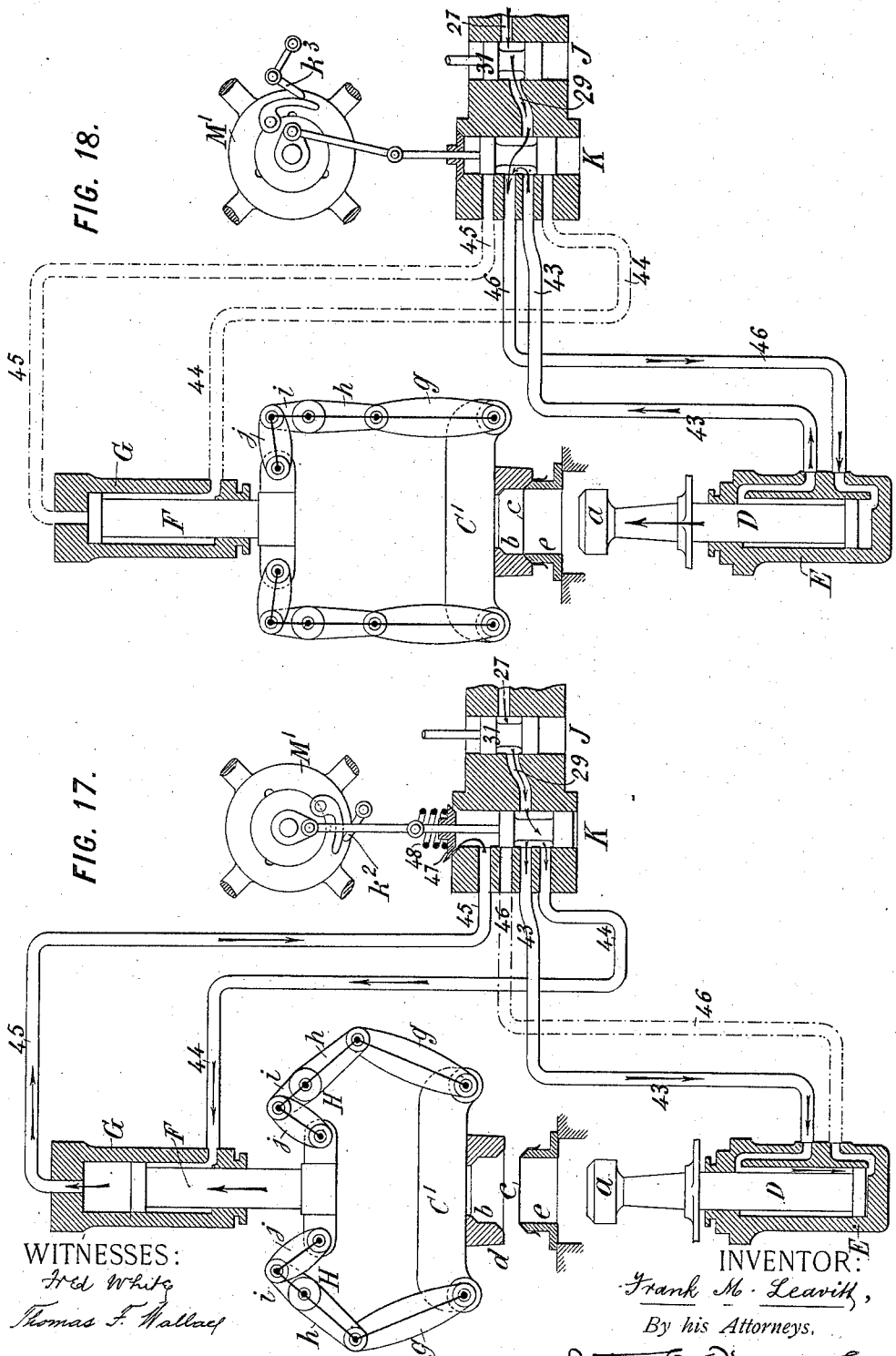
WITNESSES:
Fred White
Thomas F. Wallace
INVENTOR:
Frank M. Leavitt,
By his Attorneys, (No Model.)
7 Sheets—Sheet 7.
F. M. LEAVITT.
HYDRAULIC PRESS.
No. 604,056. Patented May 17, 1898.
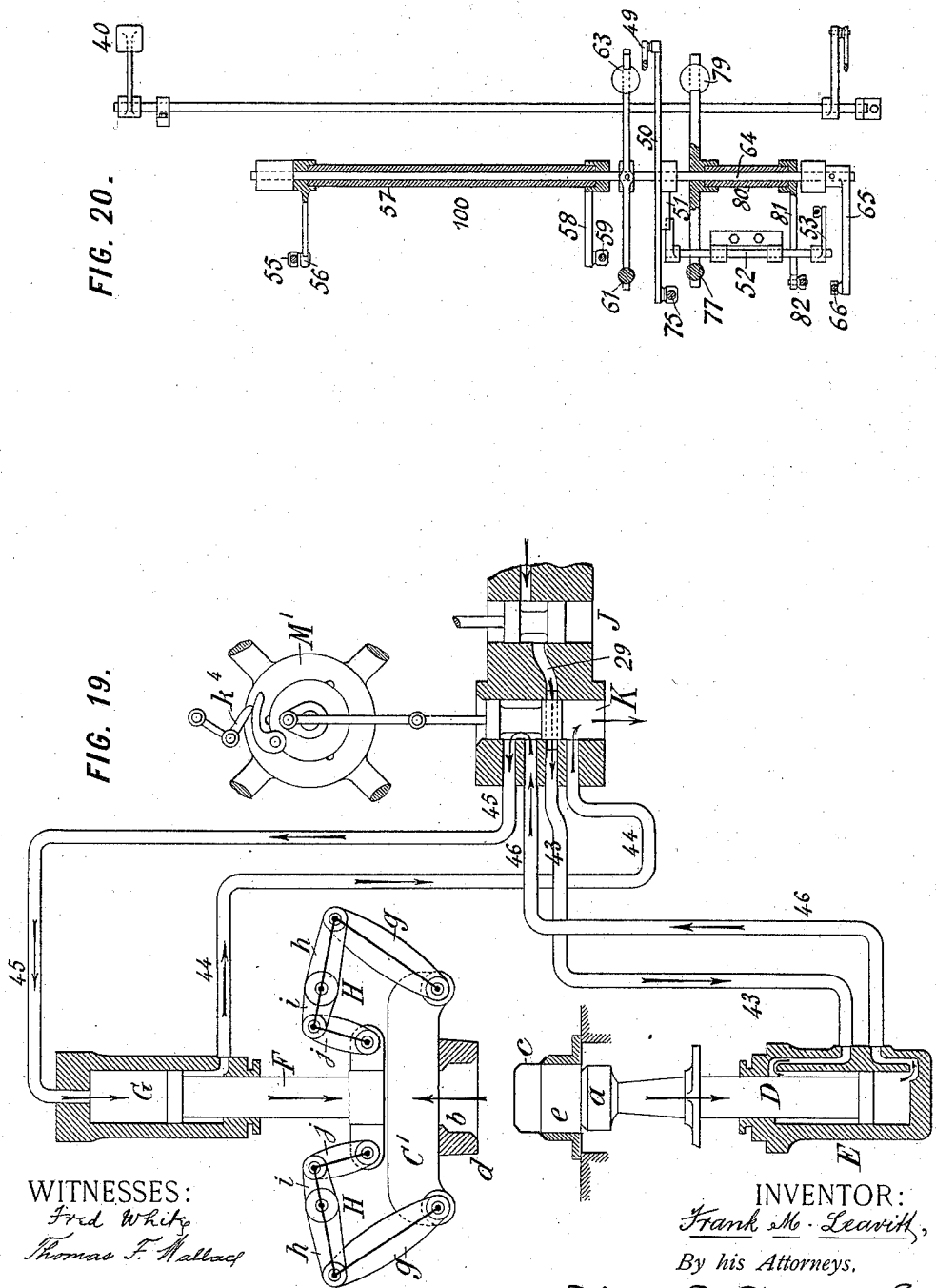
WITNESSES:
Fred White
Thomas F. Wallace
INVENTOR:
Frank M. Leavitt,
By his Attorneys,

UNITED STATES PATENT OFFICE.

FRANK M. LEAVITT, OF BROOKLYN, NEW YORK, ASSIGNOR TO THE E. W. BLISS COMPANY, OF SAME PLACE.

HYDRAULIC PRESS.

SPECIFICATION forming part of Letters Patent No. 604,056, dated May 17, 1898.

Application filed June 4, 1897. Serial No. 639,413. (No model.)

*To all whom it may concern:*

Be it known that I, FRANK M. LEAVITT, a citizen of the United States, residing in Brooklyn, in the county of Kings and State of New York, have invented certain new and useful Improvements in Hydraulic Presses, of which the following is a specification.

This invention relates particularly to hydraulic drawing-presses, although in part applicable to hydraulic presses generally.

In drawing-presses for drawing metal sheets or plates into cupped form the metal sheet or blank is first gripped between annular clamps, called a "blank-holder," which tightly hold the marginal portion of the blank, while a plunger-die or "punch" moves from one side against the metal blank and forces it into a hollow die on the other side, thereby "drawing" the sheet metal from its flat or shallow form to the depth of the die, in which operation the marginal portion of the blank is partly drawn or pulled through between the opposite clamping members of the blank-holder. For making deep articles, as sheet-metal kettles, half-barrels, &c., the drawing operation is repeated two or more times, the blank being drawn each time to a greater depth. For small or light work power drawing-presses are commonly constructed with the blank-holder and punch to be driven by means of cams or cranks, with sometimes the interposition of toggles; but for heavy work it is desirable to use a hydraulic drawing-press. Hydraulic presses have been successfully used for such exceptionally heavy work as the dishing of boiler-plates, one hydraulic ram being employed to operate the blank-holder and another one to drive the punch; but such machines being not designed for rapid or continuous work have been controlled solely by means of hand-operated valves, and their operation is necessarily very slow. Attempts have been made to construct hydraulic drawing-presses adapted for rapid work less heavy than that of boiler-plates, but still beyond the proper capacity of ordinary power drawing-presses; but in such presses the difficulty has been encountered that the blank-holder, being pressed up hydraulically, is liable to back off under the severe strain which occurs while the punch is acting on the metal, thereby permitting the metal to pucker or buckle in drawing through the blank-holder.

It is essential to successful drawing that the blank-holder shall be practically unyielding, so that when the blank-holder is closed upon the metal sheet its members cannot move apart, but must maintain a space between them no greater than that of the thickness of the metal, while yet gripping the metal not too tightly to permit it to draw through the blank-holder as it is distended by the punch. If the blank-holder grips the blank too tightly to permit it to feed through, the metal will tear apart under the stress of the punch, and if the blank-holder yields and opens partially, it will permit the metal to buckle or pucker instead of being drawn flat.

My invention aims to provide a hydraulic drawing-press which shall conform to these conditions and which, moreover, shall be capable of rapid operation and which to this end is made automatic in its movements, requiring only to be started by the operator after he has placed the blank in position, whereupon it will execute one entire series of movements required to complete one drawing operation and will then come to rest until the work shall have been removed and another blank put in place and the press again started.

My invention comprises certain interacting hydraulic and mechanical connections.

According to my invention I operate the blank-holder not directly from a hydraulic ram, but indirectly through the medium of one or more pairs of toggles so arranged that the blank-holder is seated upon the toggles, and when gripping the work the toggles are straightened. The punch is operated by direct connection with another hydraulic ram. The opposite ends of the cylinders of the two rams are connected by suitable passages with a controlling-valve or distributer so constructed that in one position the press is held at rest. In a second position fluid-pressure is admitted to the passage communicating with the blank-holder ram, while the other passage thereof is opened to the exhaust, thereby moving the blank-holder ram to close the blank-holder upon the sheet-metal blank. In a third position communication with the blank-holder ram is cut off and fluid-pressure is admitted to one side of the punch-ram to cause the punch to advance and draw the sheet metal into the die. In a fourth position fluid-pressure is admitted to one of the rams to retract it, and the opposite or eduction side of the cylinder of this ram is connected through the valve to the induction-passage of the other ram, whereby the two rams are hydraulically coupled together serially or in tandem, so that they move simultaneously, the eduction-passage from the second ram being opened to the exhaust, and upon the completion of this retracting movement of the rams (which retires the punch and opens the blank-holder to release the work) the valve is restored to its first position, thereby holding the press at rest. I provide mechanical means, such as tappet devices, whereby at the completion of each movement the valve is thrown to the next position until the end of the operation, whereupon the automatic control ceases and the press remains motionless until again started. By preference I subdivide the controlling-valve into two valves, one of which may be called the "distributer" and the other the "stop" valve, the latter being movable independently in order to stop the operation at any time or by a partial movement to control the speed. For operating these valves I employ a clutch-controlled shaft or rotary part movable a fraction of a revolution at each clutch engagement and a tappet mechanism for engaging the clutch at the end of each of the series of movements performed by the press. As the source of hydraulic pressure I provide a constantly-driven pump operating at high speed and having positively-driven valves, and the current from which is directed by the stop-valve either to the distributing-valve and thence into the hydraulic cylinders, or when the press is not operating it is directed by the stop-valve freely back into the reservoir from which the pump draws, thereby relieving the pump of resistance and requiring no useless expenditure of power while the press is inactive.

I have shown in the accompanying drawings the preferred construction of hydraulic drawing-press in which my invention is embodied.

Figure 3:
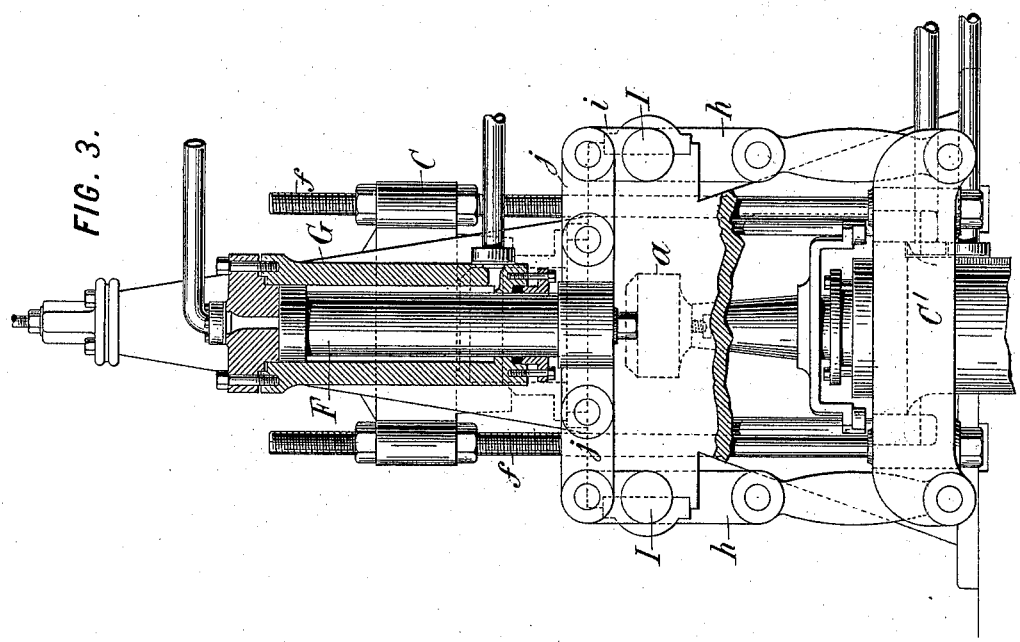
Figure 2:
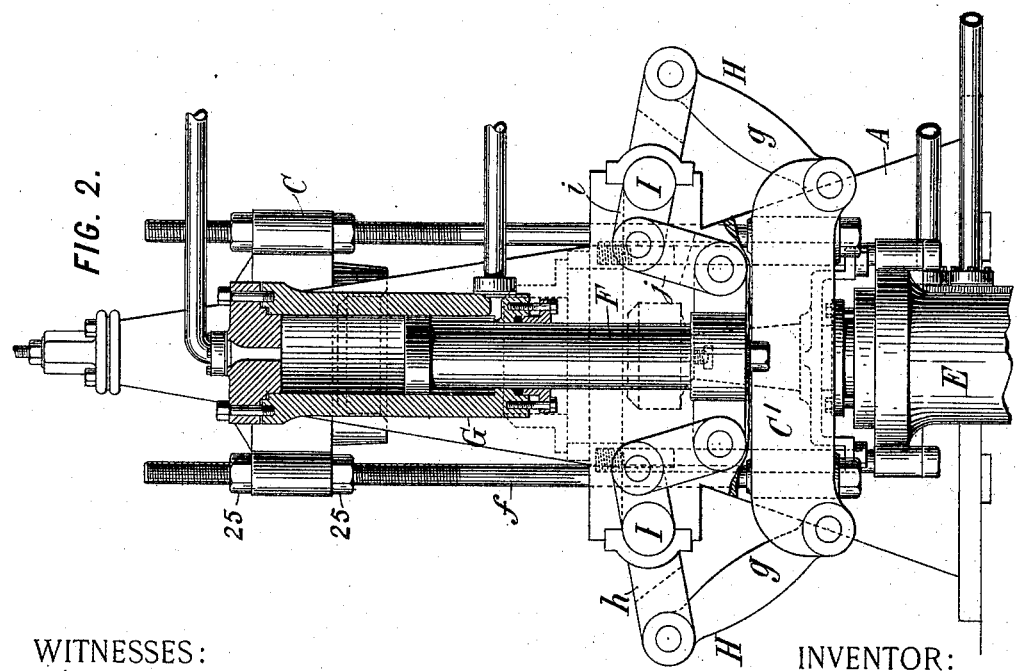

Figure 1 is a front elevation of the machine, partly in section. Fig. 2 is an end elevation, partly in section, on the line 2 2 in Fig. 1, showing the blank-holder open. Fig. 3 is a similar sectional end elevation, but showing the blank-holder closed. Fig. 4 is a horizontal section of the pump chamber or reservoir on the line 4 4 in Fig. 5 and showing the pump in plan. Fig. 5 is a vertical section thereof on the line 5 5 in Fig. 4. Fig. 6 is a vertical section through the pump in the plane of the line 6 6 in Fig. 4. Fig. 7 is a transverse section on the line 7 7 in Figs. 4 and 5. Fig. 8 is a transverse section on the line 8 8 in Figs. 4 and 5. Fig. 9 is a fragmentary vertical section in the plane of the line 9 9 in Fig. 4. Fig. 10 is a partial mid-sectional elevation looking from the rear opposite to Fig. 1 and showing the pump and controlling-valves diagrammatically to disclose the connections between the latter and the hydraulic cylinders. Figs. 11, 12, and 13 are sections showing the valves in their three positions other than that shown in Fig. 10. Fig. 14 is a diagrammatic view showing the mechanical connections for controlling the movements of the valves. Fig. 15 is a detail of the valve-operating clutch, and Fig. 16 is a transverse section thereof. Figs. 17, 18, and 19 are diagrammatic views showing the press in operation and illustrating, respectively, the three successive operative movements. Fig. 20 is a plan, partly in horizontal section, showing the mechanism through which the tappet movements are communicated to the clutch.

Referring to the drawings, let $a$ designate the punch or male die, $b$ the female die, and $c$ the blank or metal sheet to be operated upon. The blank-holder $d$ comprises two members, one of which is conveniently constructed as the margin of the die $b$ and the other as a ring $e$. Either of these members may be stationary and the other movable, or it is even possible that both might be movable. In the construction shown the ring $e$ is the stationary member, while the die $b$ is movable. Hence in the following description when reference is made to a movement of the blank-holder it will be understood that the movement referred to is that of the relatively-movable member and that in the particular construction shown it is of the clamping face or portion of the die $b$.

The blank-holding ring $e$ is mounted on a cross-piece or bed B, rigidly fixed to the main frame A of the press. The die $b$ or movable member of the blank-holder is mounted on a cross-head or platen C, which is mounted to move vertically, being guided by ways 21 on the main frame A. The punch $a$ is mounted directly upon a hydraulic ram or plunger D, having a head or piston 22 and moving in a hydraulic cylinder E, which may, as shown, be connected to the bed B by pillars or tie-rods 23.

The platen C is mechanically connected to and operated by a hydraulic plunger or ram F, having an enlarged head or piston 24 and working in a cylinder G, which is shown as fastened upon the outer side of the main press-frame A.

The connection between the platen C and the ram F is made through the medium of toggles, as essentially shown in Figs. 17, 18, and 19, and which in practice are preferably arranged and constructed as shown in Figs. 1, 2, 3, and 10. The platen C is connected by upright rods $ff$ to two cross-heads C' C' beneath, to the ends of which are jointed the links $gg$ of two pairs of toggles H H, the other toggle of each pair being a toggle-arm $h$, projecting from a rock-shaft I. The rock-shafts I I extend across the front and rear of the frame, have bearings in the uprights thereof, and on one end of each is fixed a crank-arm *i*, these two crank-arms being connected in any suitable manner to the ram F, preferably by links *j j*, interposed between the arms and the cross-head, which is fixed on the lower end of the ram.

In Figs. 17, 18, and 19 in order to make the relations more clear the die *d* is shown as carried underneath the cross-head C', which thus constitutes the platen. When the ram F is down, the die is raised, as shown in Fig. 17, and when the ram rises the die is lowered by the straightening of the toggles H H, as shown in Fig. 18. In the latter position the toggles H H transmit the entire strain from the blank-holder to the shafts I I, and hence to the main frame A, so that the blank-holder is held rigidly closed by the entire strength of the frame, and the thrust tending to open the blank-holder, being transmitted in the line of the toggles, has no tendency to turn the shafts I I, and hence cannot be transmitted to the ram F. If this thrust were transmitted directly to the ram F, there would be liability that this ram would yield to the thrust to the extent that leakage can occur around its piston-head and stuffing-box, as well as in the controlling-valve. Hence by this simple intermediation of the toggles between the ram and platen I avoid this serious disadvantage heretofore inherent in hydraulic drawing-presses.

In the construction shown in Figs. 1, 2, and 3, where the platen C is mounted above the cross-heads C' on rods *f f*, the press is made very compact and at the same time means is provided for adjusting the blank-holder, the rods being threaded and the platen being confined thereon between adjusting-nuts 25 25, by which the platen may be raised or lowered to bring the blank-holder to the desired adjustment.

The liquid for operating the hydraulic rams is pumped by a pump P through the controlling valve or valves, the latter comprising a stop-valve J and a distributing-valve K, Fig. 10, and from the latter lead the pipes or passages which communicate with the opposite ends of the respective cylinders E and G. The pump and valves are inclosed in a casing or tank L, which constitutes the reservoir for holding the oil or other liquid employed for the hydraulic operation.

The construction of the stop-valve and distributer may be widely varied and, if desired, the functions of both may be combined in one valve. The stop-valve J receives the stream of liquid from the pump and either directs it to the distributer-valve or permits it to escape freely into the reservoir L; or in an intermediate position it may admit a more or less reduced stream to the distributer, correspondingly choking the escape or short-circuiting of the oil to the reservoir. The distributer-valve directs the stream of oil into either end of either hydraulic cylinder and by its movement to different positions determines the direction of flow of the liquid, and hence controls the movements of the press. In the construction shown both valves are operated by a shaft M above, which shaft has a crank for operating the distributer K and a cam 26 for working the stop-valve J. The exact arrangement of the shaft M is shown in Figs. 5 and 7. The liquid from the pump flows through a port or passage 27 to the valve J, which has a piston 28, which when above said port, as in Fig. 10, directs the liquid through a port 29 to the distributer-valve, or when lowered, as in Fig. 11, permits the free escape of the liquid, as shown by arrows in that figure. Hence the valve J may be any valve which by movement to two opposite positions accomplishes these respective results, but preferably it is made with two pistons moving in a cylinder with which the ports communicate, the stem carrying the pistons being provided with a roller which is acted on by the cam 26 and is pressed up by a spring 30, Fig. 5.

The distributer K is constructed, preferably, as a cylinder, having four ports at different levels and two pistons 31 and 32, separated sufficiently to bridge two ports, and having sufficient width of face to cover each one port, a stem being extended upward and engaging the crank on the shaft M, preferably by being formed with a slotted cross-head, as shown in Fig. 5. Of the four ports the upper and lower ones are connected, respectively, to the upper and lower ends of the cylinder G, and the two middle ones are connected to the opposite ends of the cylinder E. The distributer K is movable to three positions corresponding to the upstroke, downstroke, and mid-stroke of the crank, the upstroke position being shown in Fig. 13, the downstroke in Fig. 10, and the mid-stroke in Figs. 11 and 12, the valve K occupying the same position in both the latter figures; but the cam 26 by being upturned in one and downturned in the other closes the valve J to the distributer in Fig. 12 and opens it to the reservoir to short-circuit the fluid in Fig. 11. Hence for operating the valves the shaft M is turned successively to four different positions ninety degrees apart. To accomplish this, I preferably provide a continuously-driven pulley M', turning loosely on this shaft and driven by a belt 33, Fig. 1, with a clutch mechanism for coupling the shaft to the pulley during a quarter-revolution, and then uncoupling it and leaving it stationary until again coupled, so that the shaft is driven a quarter-revolution each time the clutch is operated.

The clutch may be variously constructed; but a simple and suitable form is that shown in Figs. 14, 15, and 16, where the pulley M' turns freely on a sleeve or hub fixed on the shaft, having, preferably, flanges 34, Fig. 16, (not shown in Figs. 14 and 15,) in which is journaled a spindle 35, which is half cut away, as shown in section in Fig. 15, so that when the clutch is disengaged no portion of this spindle protrudes into contact with the hub of the pulley M', this being the position of rest shown in Fig. 14, where an arm 36, fixed on the end of the spindle, is held by a dog $k$; but as soon as this dog $k$ is moved out of the way, as shown in Fig. 15, the arm 36 is thrown outward by a spring 37, thereby causing the spindle 35 to rotate into engagement with a notch 38 (three being shown) in the pulley-hub, so that the pulley and shaft are temporarily locked together and the shaft revolves with the pulley until the arm 36 is pushed back by the next dog $k^2$, which is ninety degrees removed from the first, whereby the clutch is disconnected, and the shaft M, being no longer driven, stops. There are four dogs $k$, $k^2$, $k^3$, and $k^4$, as shown in Fig. 14, so that this operation is repeated each time one of these dogs is displaced to permit the clutch to engage. The clutch described is a well-known clutch commonly employed for imparting one revolution at a time.

The clutch is operated by tappet mechanism. (Shown most clearly in the diagram Fig. 14.) The description of this mechanism will be given in connection with the operation which will now be described.

Figs. 14 and 11 show the machine in position of rest. The liquid delivered from the pump through passage 27 is cut off from the distributer by the piston 28 of stop-valve J and flows freely out at the top of this valve, falling back into the mass of oil in the reservoir, so that the pump works without load. The pulley M' revolves without turning the valve-shaft M, since the clutch is disconnected, the dog $k$ holding the clutch-arm 36 pressed in. This dog is connected by a link 39 to a treadle-lever 40, which is pressed up by a spring 41, Fig. 14, which is stronger than clutch-spring 37. The parts will remain in this position until the operator, having adjusted the blank $c$ upon the blank-holder ring $e$, as shown in Fig. 17, depresses the treadle 40, and thereby releases the restraining-dog $k$, whereupon the clutch engages and the shaft M is driven by the revolving pulley during one-quarter of a revolution, until the clutch-arm is disengaged by the dog $k^2$, which has a spring 42 stronger than the clutch-spring. This movement carries the stop-valve J up to the position shown in Figs. 10 and 17, so that the flow is directed from port 27 into port 29, leading to the distributer K, and the latter is raised to the position shown in the same figures, so that port 29 is put into communication with the two lower passages 43 and 44, the upper passage 45 is exposed above the upper valve-piston 31, and the port 46 is closed by this piston. The passages 29 and 43 are in constant communication, being extended annularly around the valve-chamber. It hence results that whenever the fluid-pressure is admitted to the distributer it is transmitted through passage 43 to the upper side of hydraulic cylinder E and presses the ram D downwardly. As the ram D is already at the bottom of its stroke, this pressure simply holds it down, since the passage 46 is closed, so that no pressure can reach the under side of this ram. The flow accordingly takes place from passage 29, through distributer K, to passage 44, to the under side of ram F, which moves upward, as shown in Fig. 17, thereby lowering the blank-holder $d$ until upon the straightening of the toggles the blank-holder closes upon and grips the blank, the end of this movement being shown in Fig. 10. The liquid expelled from cylinder G by this movement flows out through passage 45 to the valve-chamber of distributer K, from which it escapes by lifting a valve 47, which is pressed down by a spring 48. This valve is employed to moderate the movement, since the weight of the blank-holder platen C and other descending parts is considerably greater than that of the ram F and other ascending parts, so that to prevent a rapid falling movement of the platen it is necessary either to counterbalance it or to interpose a resistance to the outflow of fluid from the cylinder G, and by preference I have chosen the latter means, the spring 48 being given sufficient tension to overcome the preponderating weight of the descending parts, and thereby require that some force be exerted through the ram F in order to press down the platen. Any arrangement of choking or throttling valve in connection with the eduction-passage 45 will answer this purpose. At the end of this first movement the dog $k^2$ is automatically displaced in order to reëngage the clutch and cause the shaft M to make another quarter-turn. This may be done by the means shown in Fig. 14, where the ram F is connected by a link 49 to a lever 50, having a tappet-arm 51, which as the ram reaches the end of its stroke strikes a lever 52 and through a link 53 communicates its movement to the dog $k^2$. The clutch then carries the shaft M a quarter-turn until it is disengaged by the next dog $k^3$. This brings the valves to the third position. (Shown in Figs. 12 and 18.) The valve J is not moved, but the valve K is restored to its first position, where its pistons close both passages 44 and 45, leading to the ram F, thus holding this ram immovable, and consequently retaining the blank-holder stationary. The two intervening passages 43 and 46 are put in communication, so that the hydraulic pressure is admitted to both ends of the cylinder E, and by reason of the area of the under side of the ram head or piston being considerably greater than that on its upper side the ram is forced upward, the flow taking place from passage 29, to distributer K, to passage 46, thence beneath the ram, forcing it up and expelling the liquid from its upper side through passage 43 back to the distributer K, where it commingles with the liquid flowing into passage 46, so that more liquid flows into the cylinder E than flows out of it to the extent of the difference in capacity on opposite sides of the ram or piston, or, in other words, the upward pressure corresponds to the cross area of the neck of the ram D. As the ram D carries the punch $a$, this upward movement causes the punch to draw the metal into the die $b$. At the end of this movement the clutch is again engaged to give the shaft M another quarter-turn. To this end the pawl $k^3$ is retracted by any convenient mechanism, preferably by that best shown in Fig. 14, where the ram D carries a cross-head 54, which connects by a link 55 to a lever 56, fixed on a shaft 57, to which also is fixed the other lever-arm 58, which is connected by a link 59 to a sliding sleeve 60, sliding freely upon a vertically-movable rod 61, on which is set a tappet or collar 62. The weight of the rod 61 ordinarily rests on a counterweighted lever 63, which is fixed on a shaft 64, the other arm 65 of which is in practice connected by a single link 66, Fig. 1, to the dog $k^3$; but to make the connection clear in Fig. 14 I have there shown it as connecting through link 67, elbow-lever 68, link 69, elbow-lever 70, and thence by link 66 to the dog. As the ram D rises it pushes up the slide 60 until the latter strikes the tappet 62 and raises the rod 61, thereby lifting its weight off the counterweighted lever 63, the weight of which is less than that of the rod, but which is sufficient to move the dog $k^3$ and release the clutch. The shaft M then makes another quarter-turn to the fourth position, (shown in Figs. 13 and 19,) where the clutch is disengaged by the dog $k^4$. This movement does not affect the valve J, but carries the valve K to its uppermost position, where its pistons connect the two upper ports 45 and 46, while opening the lower port 44 to the discharge. The liquid now flows, as shown in Fig. 19, from passage 29 by passage 43 to the upper end of cylinder E, thereby pressing down the ram D, while the liquid beneath it is expelled through passage 46 to the distributer, which connects it with passage 45, and thence to the upper end of cylinder G, which it forces downward, while the liquid from beneath its piston-head flows out through passage 44 to the distributer and wastes freely into the reservoir. This movement causes both rams to simultaneously descend, thereby lowering the punch $a$ and raising the platen C, carrying the blank-holder $d$ and die $b$. The ascent of the die carries the blank $c$ up frictionally with it until the latter is expelled by a "knock-out" 71, consisting of a disk mounted on a stem 72, which is fixed to the cross-head 73 of the main frame of the press, being vertically adjustable by any suitable means, preferably by being screw-threaded and clamped by adjusting-nuts 74 74, as shown in Fig. 1. At the end of this third movement the clutch is again engaged to turn the shaft M another quarter-revolution, and thereby restore the valves to the first position. This is done by retracting the dog $k^4$ through the medium of any suitable tappet mechanism, preferably that shown best in Fig. 14. The ram F is connected by link 49 to lever 50, already referred to, the opposite arm of which connects by a link 75 to a sleeve 76, which slides freely on an upright rod 77, on which is fixed an adjustable tappet or set-collar 78. The lower end of the rod rests upon a counterweighted lever 79, which is fixed on a shaft 80, to which is fixed another arm 81, which in practice connects by a link 82 directly to the dog $k^4$, as shown in Fig. 1; but to more clearly show the parts in Fig. 14 the link 82 is there shown as connecting through an elbow-lever 83 and link 84 with the dog. As the ram F descends in the third movement just described it slides the sleeve 76 upward on the rod 77 until the sleeve strikes the tappet 78 and lifts the rod, thereby taking its weight off from the lever 79, the counterweight of which is not heavy enough to lift the rod 77, but is heavy enough to communicate motion through the intervening parts to draw back the dog $k^4$. The clutch then engages and carries the shaft M a final quarter-turn, bringing it again to the first position, where it is shown in Fig. 14, and where it is again arrested by the first dog $k$. By this movement the valves are again dropped to the position shown in Figs. 14 and 11, the valve J being thus moved down until it cuts off communication between the pump and the passage 29 leading to the distributer, and permits the liquid from the pump to flow out through the valve-chamber and waste freely back into the reservoir.

It is apparent from the foregoing description that that part of my invention which involves the automatic operation of the press requires the alternation of hydraulic and mechanical operations, the hydraulic operations effecting the movement of the active parts of the press—namely, the blank-holder and punch—and the mechanical operations serving to shift the valves for controlling the successive hydraulic operations. While the use of a constantly-driven part, such as a pulley with a clutch for coupling it at intervals to the intermittently-driven part, such as the shaft M, by which the valves are shifted, is preferable, yet any other mechanical arrangement adapted to shift the valves at intervals under the control of the hydraulically driven parts of the press may be substituted. The mechanism involves, essentially, valves movable to four positions—namely, first, the position of rest; second, the position which admits liquid to propel the ram which closes the blank-holder; third, the position which admits liquid to propel the ram which carries the punch or male die, and, fourth, the position which admits hydraulic pressure to both cylinders for causing the simultaneous retraction of the rams operating both the plunger and blank-holder, followed by a return to the first position. Any valve or combination of valves that is adapted for effecting the necessary hydraulic port combinations for bringing about these successive movements of the rams and any mechanical or other intermediary adapted at the end of each ram movement to cause the shifting of the controlling valve or valves to the position for causing the next movement will be within my invention. I have referred to three ram movements, the third movement consisting in the simultaneous retraction of both rams, and this is preferable because of the saving of time as compared with retracting the two rams by two separate movements; but my invention is not to be understood as being limited to the simultaneous retraction of both rams, except in so far as it is expressly limited thereto in the claims.

The tappet mechanism shown is preferred because of the facility of its adjustment to various sizes of dies and varying lengths of stroke. The only ram movement which is not subject to variation is the upward movement of ram F, which should extend invariably to such point as will straighten the toggles H H. The downward movements of this ram should be variable in proportion to the variations in depth of the die $b$, and the extent of its downstroke may be varied by setting the tappet-collar to varying heights on the rod 77. The same adjustment controls also the downstroke of the ram D, since during the return stroke the two rams are hydraulically coupled together in tandem, so that at the end of a given descent of the ram F the tappet 78 is encountered and displaced and the clutch-dog $k^4$ is moved to engage the clutch and shift the valves, and thereby stop further movement of the rams. The extent of upstroke of the ram D, which should vary in proportion to the depth of the dies, is adjustable by setting the tappet 62 higher or lower on the rod 61.

The special construction of pump by which the liquid is forced into the press-cylinders is best shown in Figs. 4 to 8. The pump is a high-speed duplex double-acting pump having positively-driven valves. Power is applied by a belt or otherwise to a shaft 85, having two cranks set at ninety degrees apart, which through pitmans 86 communicate movement to two levers or walking-beams 87, which are pivoted on a shaft 88. Each lever 87 connects on opposite sides of its axis with pump pistons or plungers 89 and 90, respectively, the positions of which are indicated by dotted circles in Fig. 4. The two plungers connected to one lever constitute together a double-acting pump, and each such pump is controlled by a valve 91, which is driven positively by connection with the lever 87 of the other pump, the valve being connected by a link to a pin 92, projecting from such opposite lever. By reason of the two levers being vibrated ninety degrees apart each valve is stationary in one extreme position and the plungers, the flow from which it controls, are at midstroke and moving with greatest rapidity, and, conversely, as the plungers reach either end stroke and stop their valve is then at midstroke with the ports closed and is moving at maximum speed to reverse the ports preparatory to the next opposite stroke of the plungers. The port connections are most clearly shown in Fig. 6, where the valve is shown as though it were in the same plane with the plungers. The suction-pipe 93 from the oil-reservoir opens directly into the bottom of the valve-chamber 94, from which a port 95 communicates with the cylinder of plunger 89, while a similar port 96 communicates from the valve-chamber to the cylinder of plunger 90, and between these is an outflow-port 97. The valve, in addition to an upper intercepting-piston, which answers as a stuffing-box, has two active pistons 98 and 99, the space between which is adapted to connect either of the ports 95 or 96 with the outflow-port 97. When the valve is lifted, as in Fig. 6, it uncovers port 95, so that it communicates with the suction-pipe 93, and when the valve is lowered, as in Fig. 5, the liquid flows through the hollow of the valve to above its piston 98, and thence enters the port 96. This valve construction, however, is not new in itself and may be greatly varied. This pump is designed for operating at two hundred revolutions per minute and is adapted to work up to a maximum pressure of two thousand pounds per square inch, these figures being given only by way of illustration, since other speeds and pressures are admissible. At this high speed any ordinary leakage around the plungers and valves becomes inconsequential, and a pump of small size and compact design becomes admissible in a hydraulic press requiring for rapid operation a flow of large volume under heavy pressure. The outflow-ports 97 from the two valves 91 unite and merge into the passage 27, leading to the valve J. The passage 97 also extends to a relief or safety valve 100, (shown in Fig. 5,) consisting merely of a tappet-valve pressed down by a spring with sufficient pressure to resist any normal hydraulic pressure and adapted to open in case from any cause the pressure becomes so high as to involve danger of breakage. The position of this valve is denoted at 100 in Fig. 4. The essentials of this pump are that it shall be double acting and duplex in order to discharge a constant stream of uniform velocity, and by reason of its high speed that its valves to avoid hammering shall be positively driven, the valve for each double-acting pump being driven from the other and the two pumps being coupled ninety degrees apart.

As already stated, the pump and controlling-valves are all inclosed in the casing L, which serves also as the reservoir for the liquid. This construction has the advantage of inclosing all parts of the pump and of insuring their thorough lubrication, since oil is used as the hydraulic liquid, and the motion of the pump is accompanied by a sufficient spattering of the oil to keep all the working parts thoroughly coated therewith. For lubricating the bearings of the crank-shaft 85 I provide a funnel 101, Fig. 9, arranged to catch the drops or spatterings of oil and having a tube to conduct them into a groove along the top of the bearing. Any oil passing through the bearing and which might escape on the exterior is arrested by entering a circumferential groove 102, from the lower side of which a channel 103 leads back into the casing L to return the oil thereto.

I provide also means for graduating the flow in order to vary the speed of movement of the rams. This might be done by separate means; but I preferably provide for this purpose a special construction of the stop-valve J. As best shown in Fig. 10, the port 27 where it opens into the valve-chamber is made wider than the face of the piston 28, so that by lowering the valve J a position may be reached in which the piston 28 leaves the port 27 partly open on both sides, thereby permitting a partial escape upwardly, and hence only a partial flow under pressure downwardly, through the port 29. By this means the pressure transmitted through the distributer can be varied to a nicety, since the lower the valve is placed the more nearly the flow to the distributer is cut off, and at the same time the more the pressure is lowered by opening a free outflow above of greater area, and vice versa. For thus adjusting the height of the valve J, I provide the means shown in Fig. 5, consisting of a variable stop device to control the extent of opening, comprising in the preferred construction a lever 104, one end of which is pivoted to the stem of the valve J and the other end of which engages a nut 105, which is adjusted up or down by a screw-stem 106. If, for example, it is desired to operate the press very slowly in order to adjust the tappets or for other reasons, the operator turns the stem 106 by its exterior hand-wheel, and thereby presses down the valve J to practically the bottom of its throw, and then starting the press by pressing the treadle he will turn the stem 106 in the contrary direction, so as to slowly elevate the valve J until the press starts and moves with the speed required for his purpose. Having completed this adjustment and desiring that the press shall travel at normal speed, he continues to elevate the valve until the speed of the rams reaches any desired rate up to the maximum, which is reached when the valve J is permitted to ascend to the highest point which the cam 26 admits of.

It must not be inferred from the particularity of detail with which I have described the exact construction shown that my invention is limited to the details thus set forth, since, in fact, my invention is susceptible of wide variations without departing from its essential features.

I claim as my invention the several improvements in hydraulic presses defined in the following claims, each substantially as hereinbefore specified, namely:

1. In a press having two hydraulic cylinders and rams, the combination therewith of a controlling-valve and communicating passages adapted in one position of said valve to connect the eduction side of one cylinder with the induction side of the other, whereby movement of the ram of the former acts through the intervening hydraulic column to move the ram of the latter, and simultaneous movement of the two rams is insured.

2. In a drawing-press having two hydraulic cylinders and rams, the one for working the blank-holder and the other the punch, the combination therewith of a controlling-valve and communicating passages adapted in one position of said valve to connect the eduction side of one cylinder with the induction side of the other, whereby movement of the ram of the former acts through the intervening hydraulic column to move the ram of the latter, thereby insuring simultaneous retracting movements of the punch and blank-holder.

3. In a drawing-press having two hydraulic cylinders and rams, the one for working the blank-holder and the other the punch, the combination therewith of a controller comprising a distributing-valve and passages communicating therefrom with the opposite ends of the respective cylinders, and a stop-valve adapted in one position to direct the liquid from the pump to the distributer, and in another position to divert the liquid therefrom when the press is to remain at rest.

4. In a hydraulic press, the combination with its cylinder, ram, and distributer-valve controlling the flow of liquid to the cylinder, of a valve-operating mechanism comprising a continuously-driven part, a clutch interposed between such part and the valve and adapted when engaged to communicate movement to the valve, means for disengaging said clutch at the end of determinate movements thereof, and tappet mechanism operated by the ram and connected to the clutch-disengaging means to reëngage the clutch at the end of determinate movements of the ram.

5. In a drawing-press having two hydraulic cylinders and rams, the one for working the blank-holder and the other the punch, the combination therewith of a distributer-valve for controlling the flow of liquid to the respective cylinders, and means for operating said valve comprising a continuously-driven part, a clutch interposed between it and the valve, clutch-operating dogs in positions corresponding to the stopping positions of the valve, and tappet mechanisms operated by the rams and connected to the respective dogs, whereby the shifting of the valve from one position to the next is controlled by the ram movements and is effected by power derived from said continuously-driven part.

6. In a hydraulic press, the combination with a cylinder and ram, the latter tending by gravity to move in one direction, of a distributer for controlling the flow to said cylinder, a valve-opening with the exhaust therefrom during the gravitating movement of said ram, and an adjustable tension device opposing the opening of said valve, whereby the gravitating movement is opposed by said valve proportionally to the tension thereon.

7. In a hydraulic press, the combination of a hydraulic cylinder, ram, and platen, the ram and platen connected together so that the weight of the platen tends to move the ram in one direction, a distributer controlling the flow of liquid to said cylinder, and a valve having a spring holding it normally closed, and arranged to close the outlet from the distributer through which the liquid from said cylinder must escape during the gravitating movement of the ram, whereby the gravitation of the platen is opposed by the choking of the outflow of liquid by said valve proportionally to the compression of its spring, and the gravitating movement is thereby moderated.

8. In a hydraulic drawing-press, the combination of two cylinders and rams, of controlling means interposed between the source of hydraulic pressure and said cylinders, comprising a stop-valve J and a distributer K, and means for operating them comprising a shaft M having a crank connected to said distributer, and a cam adapted in one stopping position to displace said stop-valve, and means for rotating said shaft a quarter-turn at each movement.

9. In a hydraulic press, the combination with its cylinder, ram, and pump, of a valve movable to admit the flow from the pump to the cylinder, or to waste it freely back to the pump, and means for moving it to intermediate positions to choke more or less the waste and thereby to control the speed of the ram, and an adjustable stop device adapted to vary the extent of its opening.

10. In a hydraulic press, the combination with its cylinder, ram, and pump, of a stop-valve J controlling inlet-port 27 and outlet-port 29 and having its piston 28 of less effective width than the width of the port 27, whereby in an intermediate position it opens this port partly to the waste and partly to the outlet-port 29 supplying the cylinder.

In witness whereof I have hereunto signed my name in the presence of two subscribing witnesses.

FRANK M. LEAVITT.

Witnesses:
A. A. GRIFFIN,
REMSEN S. MILLS.